UNITED STATES PATENT OFFICE.

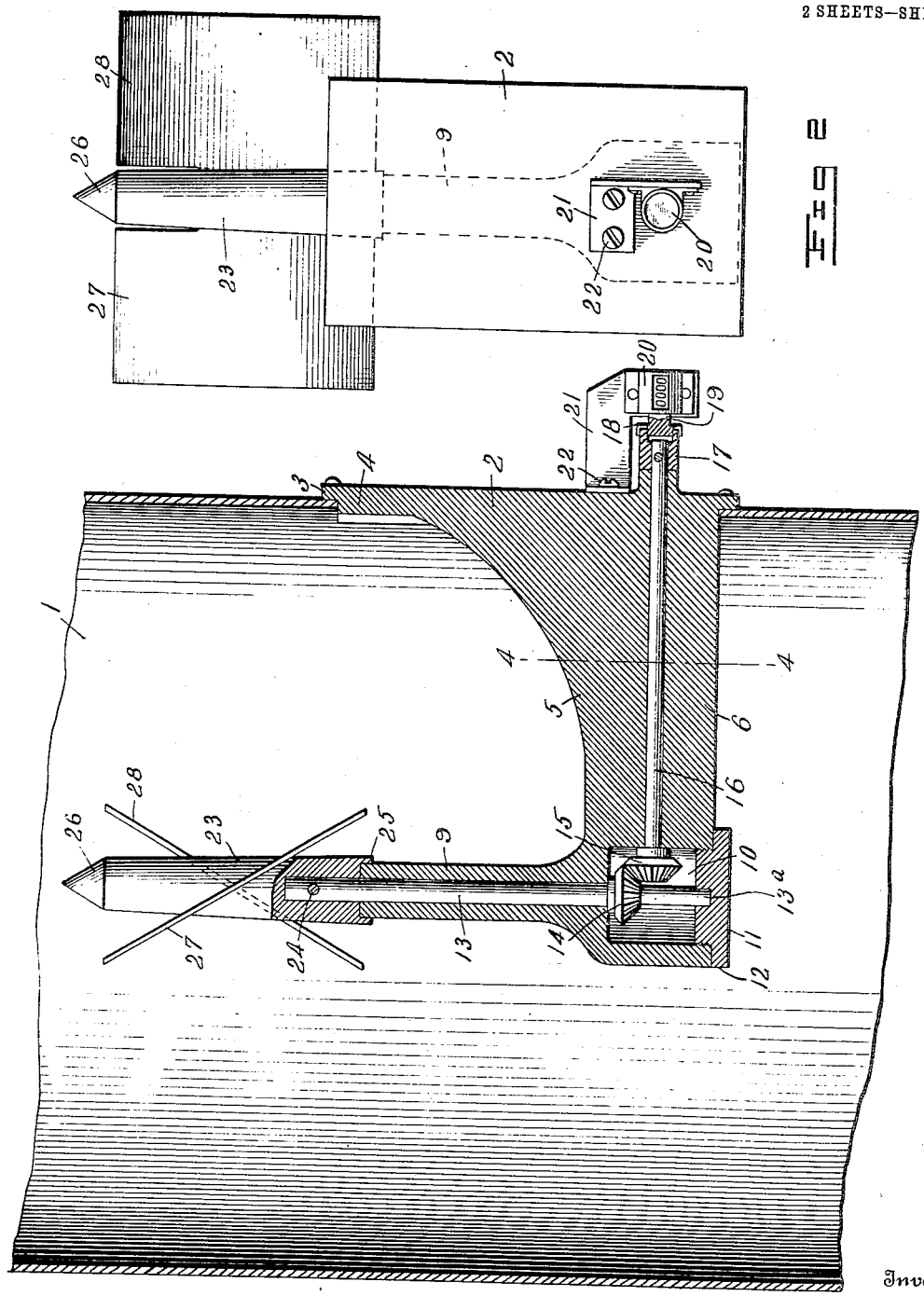

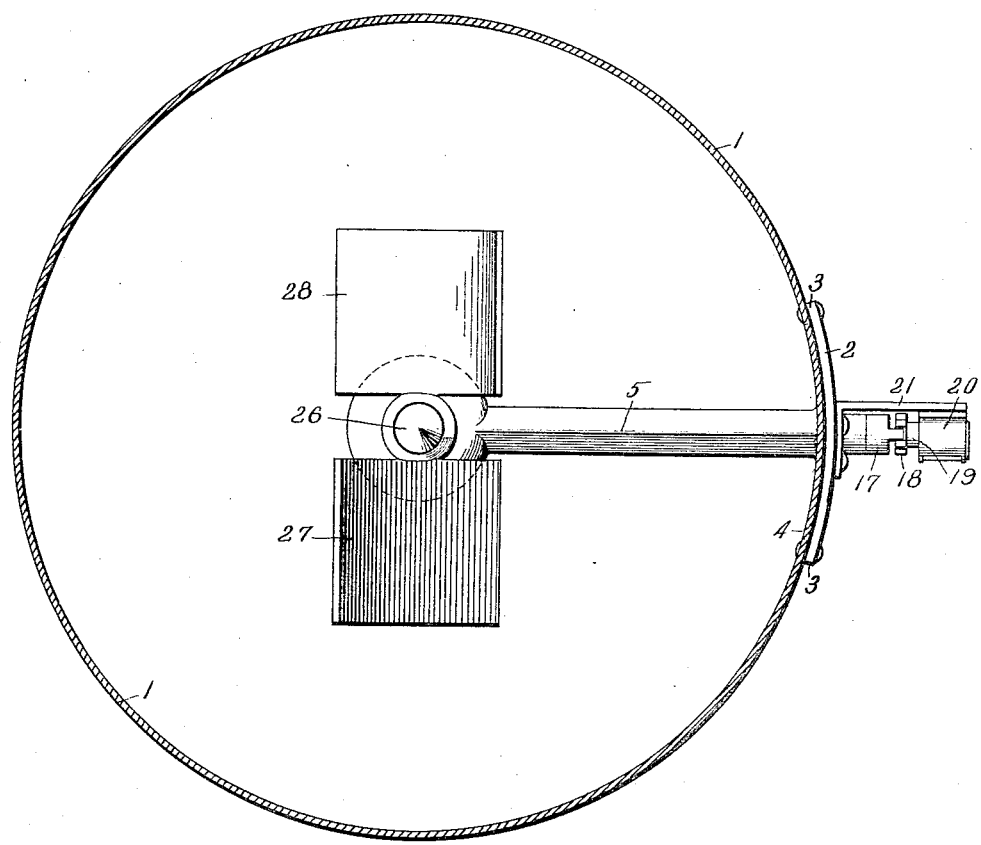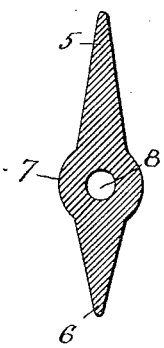

OLIVER D. HAVARD, OF SCRANTON, PENNSYLVANIA.

DEVICE FOR MEASURING GRANULAR MATERIALS.

943,405.
Specification of Letters Patent.
Patented Dec. 14, 1909.

Application filed May 3, 1909. Serial No. 493,727.

*To all whom it may concern:*

Be it known that I, OLIVER D. HAVARD, a citizen of the United States, residing at Scranton, in the county of Lackawanna and State of Pennsylvania, have invented certain new and useful Improvements in Devices for Measuring Granular Materials, of which the following is a specification.

My invention relates to measuring devices, and more particularly to devices adapted to measure granular material in bulk, such as coal, ore, grain, or the like.

One object of the invention is to provide a device of this character adapted to be inserted in a tube or conduit through which the material is passing, and to be actuated by the movement of such material so as to register the amount passing through the conduit in a given time.

Another object is to so construct such a device that it shall offer a minimum obstruction to the passage of the material.

A still further object of the invention is to construct the device of the fewest possible number of parts, and to so assemble these that all working parts shall be protected from injury or wear by coming in contact with the material.

With the above objects in view, and to improve generally upon the details of such apparatus, my invention consists in the construction and arrangement of parts hereinafter described, and illustrated in the accompanying drawing, in which:—

Figure 1 is a central longitudinal section through the conduit and measuring device, parts being shown in elevation; Fig. 2 is a side view of the measuring device itself, the conduit being omitted; Fig. 3 is an end elevation of the measuring device the conduit being shown in section; and, Fig. 4 is a transverse section, on an enlarged scale, through the supporting pedestal, substantially on the line 4—4 of Fig. 1.

Referring to the drawings in detail, 1 indicates the conduit through which the granular material is adapted to pass, and may conveniently consist of a steel tube, which is preferably arranged vertically, as shown in Fig. 1, so that the material may pass therethrough by gravity.

The working parts of the meter or measuring device are supported by means of a single pedestal which comprises a base 2, adapted to fit within an opening formed in the wall of the conduit 1, and having a flange 3, adapted to over-lap the edge of the opening so that the base may be secured to the conduit by means of rivets or other suitable fastening devices passing through the flange 3 and wall of the conduit. By reference to Fig. 1, it will be observed that the base 2 of the pedestal is extended in the direction of the length of the conduit for a considerable distance in order to afford a firm support. It will also be seen that on its upper side, the pedestal itself tapers in width gradually from the base, and projects into the conduit to a point near the center thereof. The inside surface 4 of the base 2 is preferably substantially flush with the inner surface of the conduit so as to fill the opening in the wall of the conduit to form an unbroken surface.

One of the important features of the present invention consists in so forming this pedestal that it will offer the least possible resistance to the passage of the material through the conduit. To this end the pedestal has a cross section of the shape indicated in Fig. 4. By reference to this figure, it will be seen that the pedestal comprises a central enlarged portion 7, and that the edges 5 and 6 on each side thereof are tapering or wedge shaped so as to readily divide the material as it passes through the conduit. Extending centrally of the enlarged portion 7 is a bore 8, adapted to receive a shaft hereinafter referred to.

Extending upwardly from the inner end of the pedestal is an arm 9 which is arranged substantially concentric with the axis of the conduit, and which is preferably formed integral with the pedestal. In the end of the pedestal, just below this arm, is formed a chamber 10 closed by means of a plug 11 which is preferably screw threaded into place, and which is provided with a flange 12 terminating flush with the innermost surface of the pedestal. A shaft 13 extends centrally through the arm 9 and is loosely journaled therein, and also has its lower end 13ª supported in a bearing in the plug 11. Secured to the shaft 13 within the chamber 10 is a beveled gear 14, and a similar gear 15, intermeshing therewith, is secured to the inner end of a shaft 16, which is journaled in the bore 8 of the pedestal above described, and the opposite end of which projects beyond the base of the pedestal outside of the conduit. To this extended end of the shaft 16 is secured a clutch member 17 which is adapted to engage the driving wheel 18 mounted on the shaft 19 of a register 20. This register may be in the nature of an ordinary cyclometer, and is supported by means of a bracket 21 secured to the base 2 of the pedestal by means of screws 22.

Secured to the upper end of the shaft 13, as by means of a pin 24, is a hub 23 to which a pair of oppositely disposed, diagonally extending blades or vanes 27 and 28 are secured. These vanes may be either straight, as shown in the drawing, or of any other desired shape, and, while only two blades have been shown, it will, of course, be understood that any other suitable number may be employed. The hub 23 is of slightly greater diameter than the arm 9, and is provided with an annular flange 25, adapted to over-lap the end of the arm and thus form a dust proof joint. The upper end of the hub is preferably formed pointed or conical, as indicated at 26, in order that the material may the more readily flow past the same.

It will now be understood that as the materail passes downwardly through the conduit it acts upon the vanes 27, 28, and causes the shaft 13 to revolve. This, by means of the above described gears 14 and 15, drives the shaft 16, and thus in turn, through the medium of the clutch 17, actuates the registering device, and thus indicates the amount of material passing the meter in any given time. This regulating device may, of course, be calibrated to indicate tons, bushels, or any desired units. It will be seen that owing to the pointed end 26 of the hub 23, and owing further to the thin wedge-shaped upper edge 5 of the pedestal, very slight obstruction will be offered to the passage of the material through the conduit. It will be further noted that all shafts and gears are wholly inclosed, and that no working parts come in contact with the material.

By reference to Figs. 1 and 3, it will be observed that the blades 27 and 28 are relatively small, and that the diameter of the vaned hub is very much less than that of the tube or conduit. This construction results in a large clear space being left on each side of the meter, through which the material may freely pass. The obstruction to the flow of material is thus reduced to a minimum, while the blades, coming into contact as they do with only a part of the material, act as a proportional meter, and their movement is strictly proportional to the total amount of material passing, so long as the conduit runs full.

It will thus be seen that I have provided an extremely simple and practical device for measuring granular materials of all kinds, and it is thought that the numerous advantages of my invention will be readily appreciated by those skilled in the art.

What I claim is:—

1. In a device for measuring granular material, the combination with a conduit through which the material is adapted to pass, of a meter in said conduit, and comprising a single pedestal secured in said conduit and carrying the movable parts of said meter, said pedestal constituting the sole support for said parts.

2. In a device for measuring granular material, the combination with a conduit through which the material is adapted to pass, of a meter in said conduit, said meter comprising a plurality of diagonally extending blades, a shaft on which said blades are mounted, and a single pedestal in which said shaft is journaled, said pedestal constituting the sole support for said parts.

3. In a device for measuring granular material, the combination with a conduit through which the material is adapted to pass, of a pedestal secured in said conduit and having an arm extending therefrom longitudinally of said conduit, a shaft journaled in said arm, a plurality of meter blades, and a hub to which said blades are attached secured to the end of said shaft beyond said arm, said hub having a flange surrounding the end of said arm.

4. In a device for measuring granular material, the combination with a conduit through which the material is adapted to pass, of a pedestal secured to said conduit and projecting inwardly to the center thereof, a shaft journaled in said pedestal, an arm extending from said pedestal longitudinally of said conduit, a second shaft journaled in said arm, intermeshing bevel gears carried by said two shafts, meter vanes mounted on said second shaft, inside the conduit, and a registering device connected with said first shaft, outside said conduit.

5. In a device for measuring granular material, the combination with a conduit through which the material is adapted to pass, of a pedestal secured in said conduit and having an arm extending longitudinally of said conduit and substantially centrally thereof, said pedestal having a closed chamber formed therein adjacent the arm, a shaft journaled in said arm and another shaft journaled in said pedestal, intermeshing bevel gears secured to said shafts and located in said chamber, meter vanes carried by the first shaft, and a registering mechanism operated by the second shaft.

6. In a device for measuring granular material, the combination with a conduit through which the material is adapted to pass, of a meter arranged in said conduit and comprising a shaft and a pedestal for supporting the same, such pedestal extending from the side of said conduit toward the center thereof, and comprising a substantially cylindrical enlarged portion in which said shaft is housed, and a thin flat wedge shaped portion projecting forwardly therefrom in the direction of the length of said conduit, whereby a minimum resistance is offered to the passage of the material.

7. In a device for measuring granular material, the combination with a conduit through which the material is adapted to pass, of a meter arranged in said conduit, such meter comprising a rotary shaft and a single pedestal for supporting the same, said pedestal having a base secured to the wall of the conduit, said base being extended in the direction of the length of the conduit, so as to form a rigid support.

In testimony whereof I affix my signature, in presence of two witnesses.

OLIVER D. HAVARD.

Witnesses:
C. A. BATTENBERG,
F. L. STEHLE.